United States Patent
Kwon et al.

(10) Patent No.: US 11,304,084 B1
(45) Date of Patent: Apr. 12, 2022

(54) SYSTEM AND METHOD FOR BEACON-BASED PASSIVE CLUSTERING IN MOBILE AD HOC NETWORKS (MANET)

(71) Applicant: Rockwell Collins, Inc., Cedar Rapids, IA (US)

(72) Inventors: Tj T. Kwon, Marion, IA (US); William B. Sorsby, Cedar Rapids, IA (US); Eric J. Loren, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/079,175

(22) Filed: Oct. 23, 2020

(51) Int. Cl.
    *H04W 28/02* (2009.01)
    *H04W 80/04* (2009.01)
    *H04W 84/18* (2009.01)
    *H04W 88/16* (2009.01)

(52) U.S. Cl.
    CPC ......... *H04W 28/021* (2013.01); *H04W 80/04* (2013.01); *H04W 84/18* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,171,476 B2 | 1/2007 | Maeda et al. | |
| 8,490,175 B2 | 7/2013 | Barton et al. | |
| 8,824,444 B1 | 9/2014 | Berenberg et al. | |
| 10,965,584 B1 * | 3/2021 | Kwon | H04L 45/121 |
| 10,979,348 B1 * | 4/2021 | Kwon | H04L 12/1886 |
| 10,999,778 B1 | 5/2021 | Kwon et al. | |
| 2003/0151513 A1 * | 8/2003 | Herrmann | G08B 25/003 340/573.1 |

(Continued)

FOREIGN PATENT DOCUMENTS

| | | |
|---|---|---|
| KR | 100568976 B1 | 4/2006 |
| KR | 1020160071964 A | 6/2016 |

OTHER PUBLICATIONS

Kwon et al., "Efficient Flooding with Passive Clustering (PC) in Ad Hoc Networks", Computer Communication Review. 32. 44-56. 10.1145/510726.510730, Aug. 11, 2003, 13 pages.

(Continued)

*Primary Examiner* — Kenny S Lin
(74) *Attorney, Agent, or Firm* — Suiter Swantz pc llo (57) ABSTRACT

A communications node of a multi-node communications network is disclosed. In embodiments, the node transmits to its one-hop neighbors (e.g., via beacon signals or regular hello messages) outbound neighbor lists identifying its neighboring clusterhead and gateway nodes only. Similarly, the communications node receives inbound neighbor lists from its one-hop neighbor nodes, including identifiers and node statuses for all clusterhead and gateway nodes that are one-hop neighbors to the sending node. By comparing the received inbound neighbor lists, the communications node determines whether it is on a critical path of the network, e.g., whether the multi-node communications network would be partitioned into disconnected portions without the communications node. Based on the determination, the communications node may transition its node clustering status.

14 Claims, 10 Drawing Sheets

(56) References Cited

U.S. PATENT DOCUMENTS

2007/0109979 A1* 5/2007 Fu .................... H04W 72/005
                                                    370/261
2009/0290572 A1* 11/2009 Gonia ................ H04J 3/0641
                                                    370/350
2018/0317226 A1   11/2018 Sakoda

OTHER PUBLICATIONS

Yi et al., "Passive Clustering in Ad Hoc Networks (PC)", URL: https://tools.ietf.org/html/draft-yi-manet-pc-00, Nov. 14, 2001, 31 pages.
Extended Search Report for European Application No. 21188737.7 dated Dec. 10, 2021, 8 pages.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.

\* cited by examiner

Is communications node an ORDINARY node?

Is communications node on a critical path?

408 — Transitioning the first clustering status to the gateway node status

Is communications node a CLUSTERHEAD node?

Is communications node on a critical path?

410 — Retaining the first clustering status as the clusterhead node status

SYSTEM AND METHOD FOR BEACON-BASED PASSIVE CLUSTERING IN MOBILE AD HOC NETWORKS (MANET)

TECHNICAL FIELD

The subject matter disclosed herein is directed generally to communications networks and more particularly to mobile ad hoc network (MANET) management and control.

BACKGROUND

Mobile ad-hoc networks (MANET; also referred to as, e.g., "mesh networks") are known in the art as quickly deployable, self-configuring wireless networks with no predefined network topology. Each communications node within a MANET is presumed to be able to move freely. Additionally, each communications node within a MANET may be required to forward (relay) data packet traffic. Data packet routing and delivery within a MANET may depend on a number of factors including, but not limited to, the number of communications nodes within the network, communications node proximity and mobility, power requirements, network bandwidth, user traffic requirements, timing requirements, and the like.

Optimized link status routing (OLSR) is a de facto standard for proactive routing among MANET nodes. Under OLSR, nodes may discover their two-hop neighbors (e.g., for any given node N1, one-hop neighbors N2 may be those nodes communicatively coupled with N1 and two-hop neighbors N3 are those nodes communicatively coupled with the one-hop neighbors N2 (e.g., and thus "two hops away" from the node N1 using a one-hop neighbor N2 as a relay) by exchanging hello messages. Hello messages are periodically transmitted by all nodes; each hello message sent by a node N1 may include a list of all one-hop neighbors N2 to the node N1.

OLSR may restrict duplicate retransmissions of broadcast packets by selecting a set of multi-point relays (MPR). For example, MPR nodes collect local link status information and advertise this information via efficient packet flooding. However, the identification of a subset of MPRs capable of reaching every node of the network is an NP-complete set-cover problem which cannot be optimized without global coordination. As the number of selected MPR may be as high as the number of nodes in the MANET, overlapping link advertisements may be significant and link discovery may become increasingly expensive (e.g., in terms of hello overhead as well as routing control overhead) as network density increases.

Passive clustering based on implementing dominating sets (DS) of clusterhead nodes and their corresponding clusters (e.g., including independent dominating sets (IDS)) via hello messaging provides a lower-overhead alternative to MPR in OLSR. However, conventional neighbor lists may become unwieldy as the network (and the number of neighbors to each node) grows in size and density. Further, passive clustering based on hello messaging or packet flooding may result in an unstable clustering structure prone to extensive reconstruction. For example, if two clusterhead nodes exist within a cluster, one of the clusterhead nodes will resign its clusterhead status (e.g., First Declaration Wins (FDW)). This resignation may set off a ripple effect of reclustering throughout the network. In addition, conventional passive clustering may not guarantee all critical paths. A communications node is on a critical path between two second-hop neighbors if the two second-hop neighbors would be otherwise disconnected, in which case the network may be partitioned and some nodes may not receive relayed packets.

SUMMARY

A communications node of a multi-node communications network is disclosed. In embodiments, the communications node includes a controller and communications interface (e.g., for communicating with neighboring nodes of the network). In embodiments, the communications node may initiate or participate in a beaconing cycle by transmitting to its one-hop neighbors a partial neighbor list, e.g., distinguished from a full neighbor list in that the partial neighbor list provides identifiers and clustering statuses for the sending node and for any one-hop neighbors to the node having a clusterhead or gateway node status (as opposed to every one-hop neighbor). Similarly, the node receives from its one-hop neighbors inbound partial neighbor lists, each partial neighbor list identifying the sending node and its clustering status as well as all one-hop neighbors to the sending node having a clusterhead or gateway status. Based on the partial neighbor lists received from its one-hop neighbors, the communications node determines whether or not it is on a critical path of the network (e.g., loss of a node on a critical path would partition one or more nodes of the network).

In some embodiments, the communications node transmits the outbound partial neighbor lists via hello messages.

In some embodiments, the communications node transmits the outbound partial neighbor lists via high-energy beacon signals.

In some embodiments, the communications node has an ordinary node status, determines that it is on a critical path, and immediately transitions to gateway node status.

In some embodiments, the communications node has a clusterhead node status, determines that it is on a critical path, and retains its clusterhead node status (e.g., as opposed to resigning or transitioning).

In some embodiments, the communications node retains its clusterhead status even if the clusterhead node is a member of a cluster of communications nodes having at least one other clusterhead node.

In some embodiments, the communications node updates its own local neighbor list based on the received inbound partial neighbor lists.

In some embodiments, the communications node determines an initial clustering status according to passive clustering schemes or procedures.

A method for beacon-based passive clustering in a mobile ad hoc network (MANET) or like multi-node communications network is also disclosed. In embodiments, method includes transmitting, via a communications node of the network, outbound partial neighbor lists including 1) a unique identifier and node clustering status (e.g., clusterhead, gateway, ordinary) of the transmitting node and 2) a unique identifier and node clustering status for each one-hop neighbor to the transmitting node having either a clusterhead or gateway node status. The method includes receiving inbound partial neighbor lists from each one-hop neighbor to the transmitting node; each inbound partial neighbor list likewise including 1) a unique identifier and node clustering status of the sending node and 2) a unique identifier and node clustering status for each one-hop neighbor to the sending node having either a clusterhead or gateway node status. The method includes determining, based on the received inbound partial neighbor lists, whether or not the communications node is on a critical path protecting one or more additional nodes of the network from partition (e.g., loss of a node on a critical path would partition the additional nodes away from the remainder of the network).

In some embodiments, the communications node transmits the outbound partial neighbor lists via hello messages.

In some embodiments, the communications node transmits the outbound partial neighbor lists via high-energy beacon signals.

In some embodiments, the communications node is an ordinary node that determines itself to be on a critical path, and the method includes immediately transitioning the ordinary node to gateway node status.

In some embodiments, the communications node is a clusterhead node that determines itself to be on a critical path, and the method includes retaining the clusterhead node status.

In some embodiments, the clusterhead node retains its clusterhead node status even if its cluster of communications nodes includes an additional clusterhead node.

In some embodiments, the method includes updating the local neighbor information of the communications node based on the received inbound partial neighbor lists.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to mobile communications nodes of a mobile ad hoc network (MANET) or other like a multi-node communications network capable of two-hop passive clustering via partial neighbor lists transmitted via high-energy beacon signals. Beacon-based passive clustering trades short-term network efficiency for longer-term efficiency and a generally more stable network structure without losing connectivity. By allowing proximate clusterhead nodes to retain their status, ripple-effect restructuring associated with other forms of passive clustering (and the corresponding deleterious effect on network efficiency) may be avoided.

Figure 1:
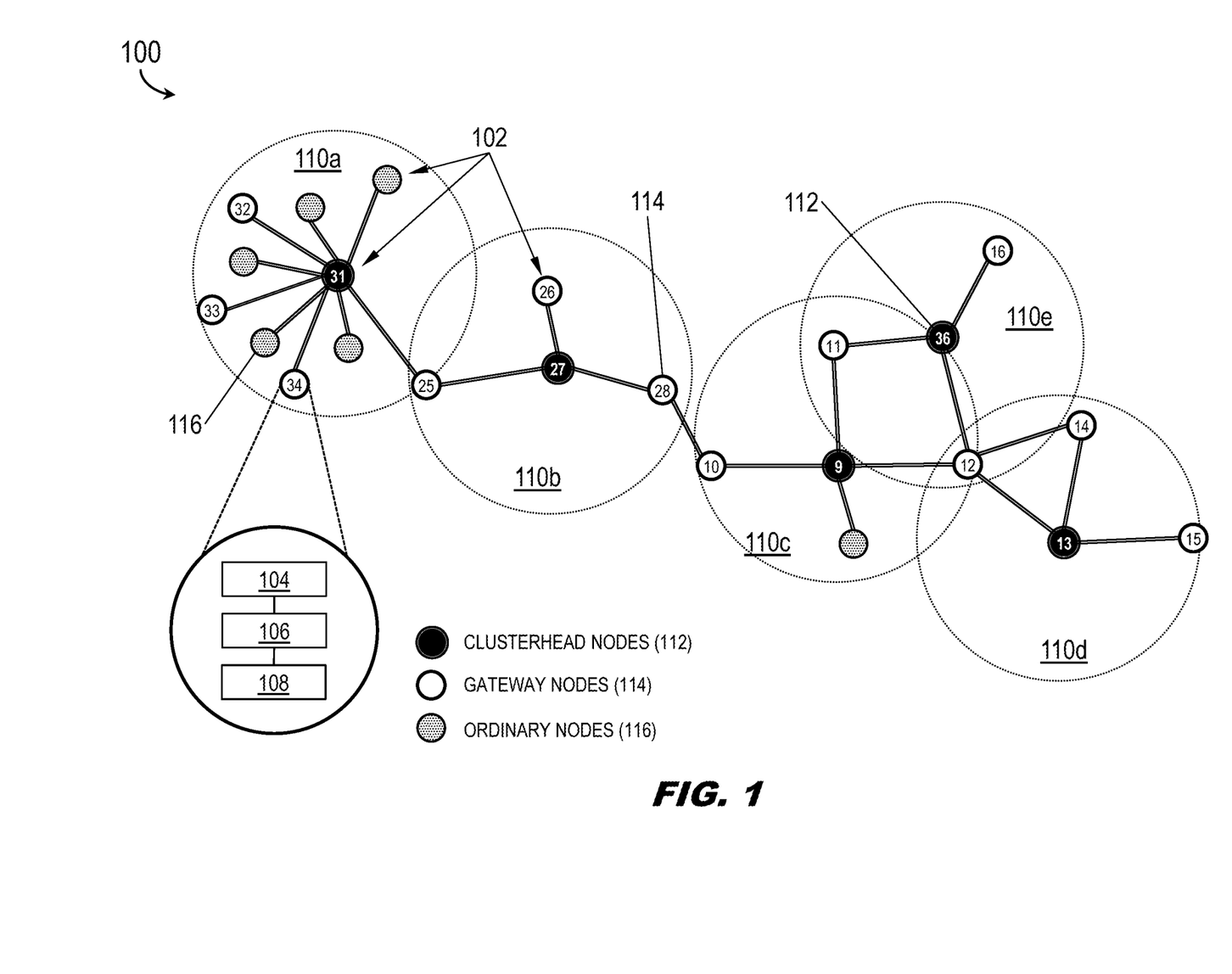
FIG. 1 is a diagrammatic illustration of a multi-node communications network according to example embodiments of this disclosure.

Referring to FIG. 1, a multi-node communications network 100 is disclosed. The multi-node communications network 100 may include communications nodes 102.

In embodiments, the multi-node communications network 100 may include any multi-node communications network known in the art. For example, the multi-node communications network 100 may include a mobile ad-hoc network (MANET) in which each communications node 102 within the multi-node communications network is able to move freely and independently. Similarly, the one or more communications nodes 102 may include any communications node known in the art which may be communicatively coupled. In this regard, the one or more communications nodes 102 may include any communications node known in the art for transmitting/transceiving data packets. For example, the one or more communications nodes 102 may include, but are not limited to, radios, mobile phones, smart phones, tablets, smart watches, laptops, and the like. In embodiments, each communications node 102 of the multi-node communications network 100 may include, but is not limited to, a respective controller 104 (e.g., control processor), memory 106, and communication interface 108.

The controller 104 provides processing functionality for at least the communications node 102 and can include any number of processors, micro-controllers, circuitry, field programmable gate array (FPGA) or other processing systems, and resident or external memory for storing data, executable code, and other information accessed or generated by the communications node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communications node 102/ controller 104, such as software programs and/or code segments, or other data to instruct the controller 104, and possibly other components of the communications node 102, to perform the functionality described herein. Thus, the memory 106 can store data, such as a program of instructions for operating the communications node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communications node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communications node 102 and the controller 104. It should be noted that while the communication interface 108 is described as a component of the communications node 102, one or more components of the communication interface 108 can be implemented as external components communicatively coupled to the communications node 102 via a wired and/or wireless connection. The communications node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communications node 102 may be configured to communicatively couple to additional communication interfaces 108 of additional communications nodes 102 of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the multi-node communications network 100 may be organized into clusters 110a-e, and each of its member communications nodes 102 may be associated with a node clustering status. For example, each cluster 110a-e may be organized around a clusterhead node 112 (e.g., clusters 110a, 110b, 110c, 110d, 110e and nodes 31, 27, 9, 13, and 36 respectively having a clusterhead node status). In addition to the clusterhead node status 112, each communications node 102 of the multi-node communications network 100 may have one of a set of clustering statuses, e.g., gateway nodes 114 and ordinary nodes 116. For example, clusterhead nodes 112 and gateway nodes 114 may be otherwise referred to as "critical nodes", and may be configured to relay route request flooding, link status advertisements (LSA), and/or other data packets to gateway nodes or ordinary nodes 116 to which the clusterhead or gateway nodes are connected or, e.g., which may be within a cluster 110a-e organized around a clusterhead node.

It should be noted that this usage of "critical node" is not equivalent to "critical path" as described in greater detail below. For example, a communications node 102 may be a "critical node", e.g., a clusterhead node 112 or a gateway node 114, but may not be on a "critical path". In embodiments, each communications node 102 of the multi-node communications network 100 may transition from one node clustering status to another clustering status as described below (see, e.g., FIG. 3 and accompanying text).

In embodiments, the communications nodes 102 of the multi-node communications networks may be referred to as one-hop or two hop neighbors. For example, the gateway nodes 10, 11, 12 (114) may be one-hop neighbors to the clusterhead node 9 (112) in that the gateway nodes 10, 11, 12 are in direct communication with the clusterhead node 9. Similarly, each of the gateway nodes 11 and 12 (114) is a two-hop neighbor to the gateway node 16 of cluster 110e, as each pair of gateway nodes (11-16, 12-16) is connected via two hops, e.g., from the origin gateway node to the clusterhead node 36 (112), and then to the destination gateway node.

In embodiments, the multi-node communications network 100 may incorporate beacon-based passive clustering for initial network configuration or for network reconfiguration in response to a status change. For example, the multi-node communications network 100 may begin as a network of gateway nodes 114, or communications nodes 102 having a default gateway node clustering status from which various communications nodes may transition to other node clustering states as the network evolves, e.g., as communications nodes join, leave, or move within the multi-node communications network. For example, each cluster 110a-e may include additional ordinary nodes 116; the density of ordinary nodes within each cluster (or, e.g., throughout the multi-node communications network 100 as a while) may increase or decrease without significantly affecting network efficiency.

Referring generally to FIGS. 2A through 2E, the multi-node communications network 100 is shown.

Figure 2A:
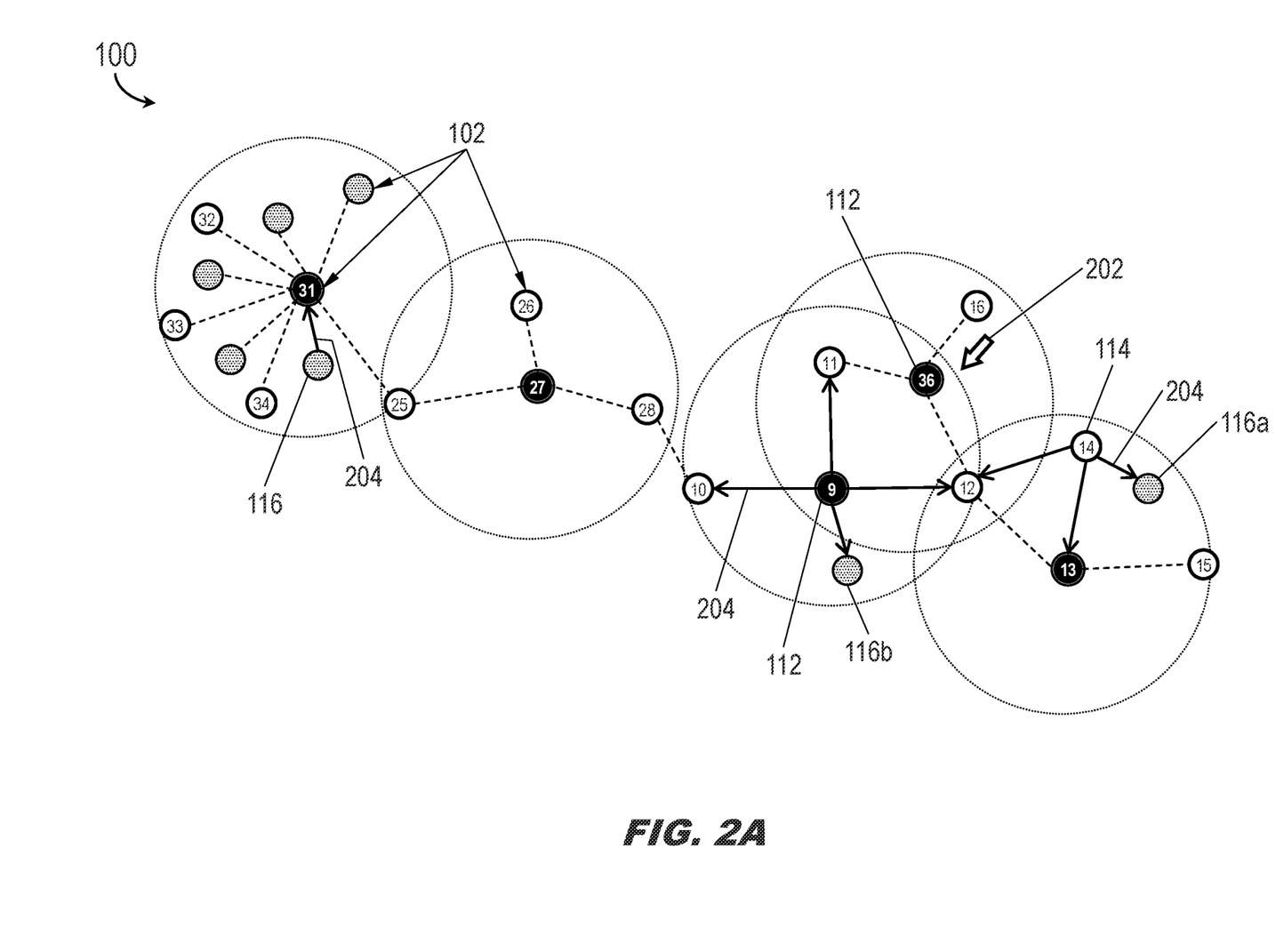
FIG. 2A is a diagrammatic illustration of outbound beaconing operations of the multi-node communications network of FIG. 1.

In embodiments, referring in particular to FIG. 2A, the communications nodes 102 of the multi-node communications network 100 may implement beacon-based passive clustering in response to a change in network status. For example, the clusterhead node 36 (112) may move (202) toward the clusterhead node 9, such that both clusterhead nodes 36 and 9 coexist within the overlapping clusters 110c, 110e. In response, the communications nodes 102 (e.g., clusterhead nodes 112, gateway nodes 114, ordinary nodes 116) may transmit partial neighbor lists 204 to their one-hop neighbors via high-energy beacon signals. Alternatively, or additionally, the multi-node communications network 100 may provide for periodic beaconing cycles at regular and/or predetermined intervals.

In some embodiments, a network configuration or reconfiguration (and critical neighbor learning) may comprise several beaconing cycles, whereas conventional flooding may construct a clustering structure within a single flooding process. For example, beaconing cycles may be generally longer in duration than packet flooding process, and clustering may be more sporadic than with packet flooding or via dominating sets. However, the resulting network clustering structure may improve stability in the long term by allowing limited co-existence of clusterhead nodes (instead of, e.g., immediate resignation of clusterheads or mutual-kill scenarios), provided the clusterhead nodes are on a critical path as described below.

In embodiments, some or all of the communications nodes 102 of the multi-node communications network 100 may transmit partial neighbor lists 204 to their one-hop neighbors via high-energy beacon signals. For example, all critical nodes of the multi-node communications network (e.g., clusterhead node 9 (112), gateway node 14 (114)) may transmit outbound partial neighbor lists 204 (and may accordingly receive inbound partial neighbor lists, as described in greater detail below). In some embodiments, ordinary nodes 116 may also transmit partial neighbor lists 204.

In embodiments, the use of high-energy beacon signals for transmission of outbound partial neighbor lists 204 may reduce the possibility that one or more one-hop neighbors may not receive a transmitted partial neighbor list. In some embodiments, partial neighbor lists 204 may be transmitted via hello messages. However, partial neighbor lists 204 may be distinguished from neighbor lists appended to conventional hello messages in that a partial neighbor list 204 transmitted by any communications node 102 includes unique identifiers and node clustering statuses for only those one-hop neighbors having either a clusterhead node status or a gateway node status (e.g., in addition to a unique identifier and node clustering status for the transmitting communications node itself). For example, the gateway node 14 (114) may transmit to its one-hop neighbors (e.g., gateway node 12, clusterhead node 13, and the ordinary node 116a) a partial neighbor list 204 including itself (node 14, gateway node status) and its neighboring critical nodes (node 12, gateway node status; node 13, clusterhead node status). Similarly, the clusterhead node 9 (112) may transmit to its one-hop neighbors (gateway nodes 10, 11, 12 and ordinary node 116b) a partial neighbor list 204 including itself (node 9, clusterhead node status) and its neighboring critical nodes (node 10, gateway node status; node 11, gateway node status; node 12, gateway node status). While both the clusterhead node 9 (112) and gateway node 14 (114) may have one or more ordinary nodes 116a-b as one-hop neighbors, none of these ordinary nodes will be included in partial neighbor lists (although these ordinary nodes may receive and transmit partial neighbor lists 204, and may transition in status to gateway nodes or clusterhead nodes, as shown in more detail below by FIGS. 2F and 3).

Figure 2B:
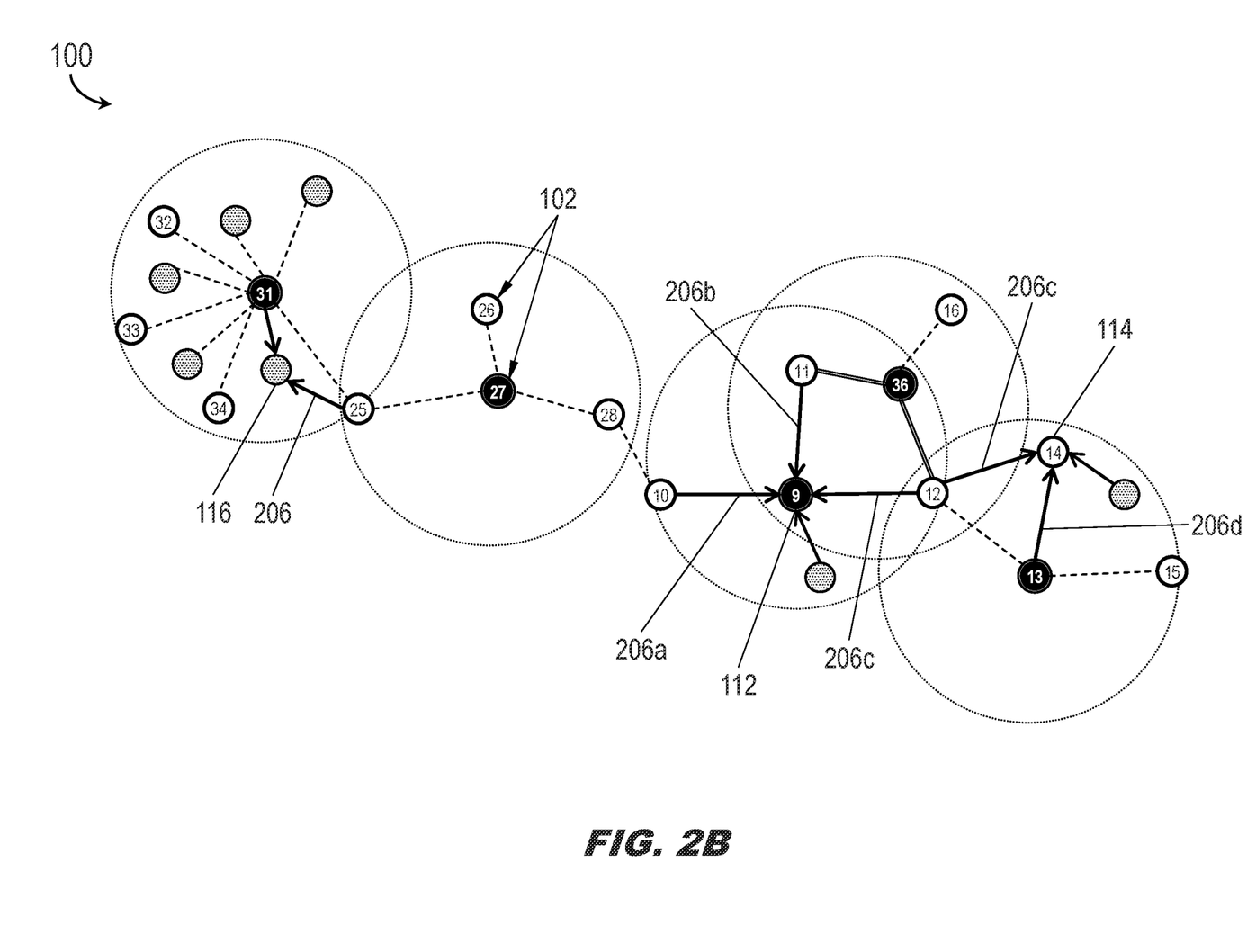
FIG. 2B is a diagrammatic illustration of inbound beaconing operations of the multi-node communications network of FIG. 1.

In embodiments, referring also to FIG. 2B, some or all communications nodes 102 of the multi-node communications network 100 may likewise receive inbound partial neighbor lists 206 via beacon signals transmitted by their one-hop neighbors. For example, the clusterhead node 9 (112) may receive a partial neighbor list 206a, 206b, 206c from each of its one-hop neighbors (e.g., the gateway nodes 10, 11, and 12). Similarly, the gateway node 14 (114) may receive a partial neighbor list 206c, 206d from each of its one-hop neighbors (gateway node 12, clusterhead node 13), and the ordinary node 116 may receive a partial neighbor list 206 from each of its one-hop neighbors (gateway node 31, clusterhead node 25).

Figure 2C:
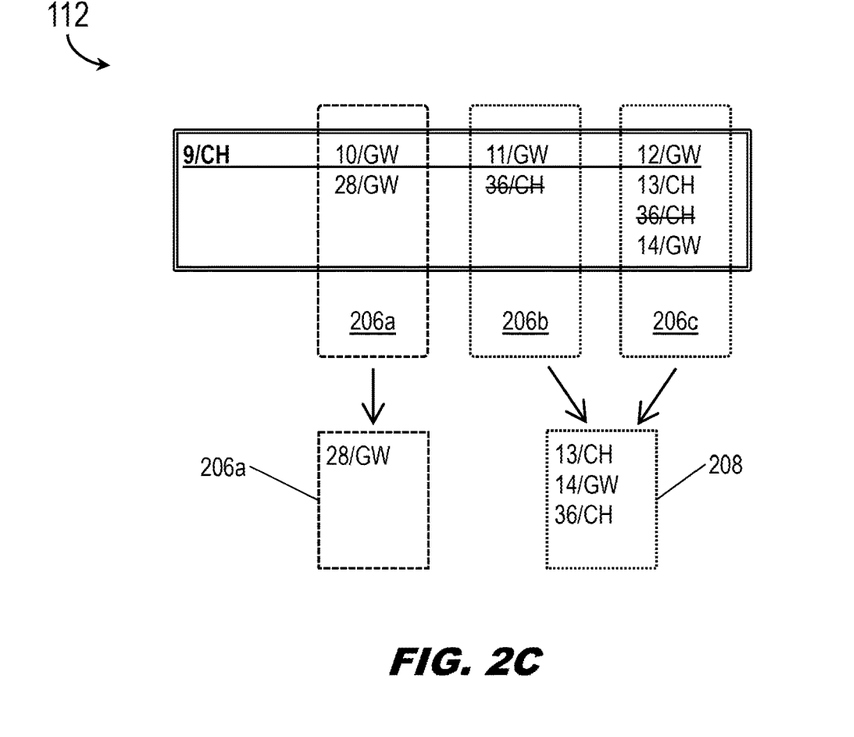
FIGS. 2C and 2D are diagrammatic illustrations of critical path detection operations of member communications nodes of the multi-node communications network of FIG. 1.
Figure 2D:
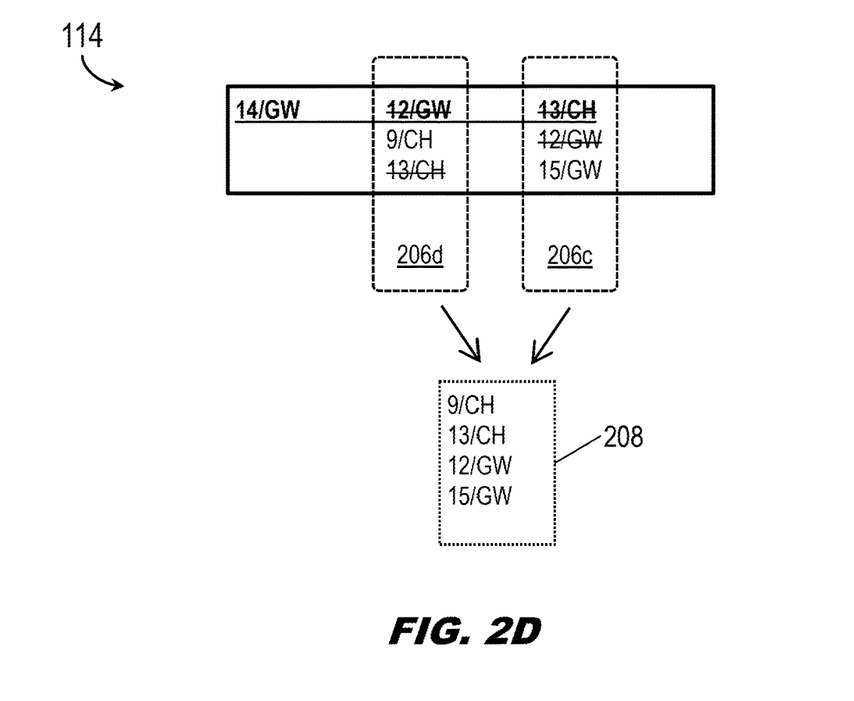
Figure 2E:
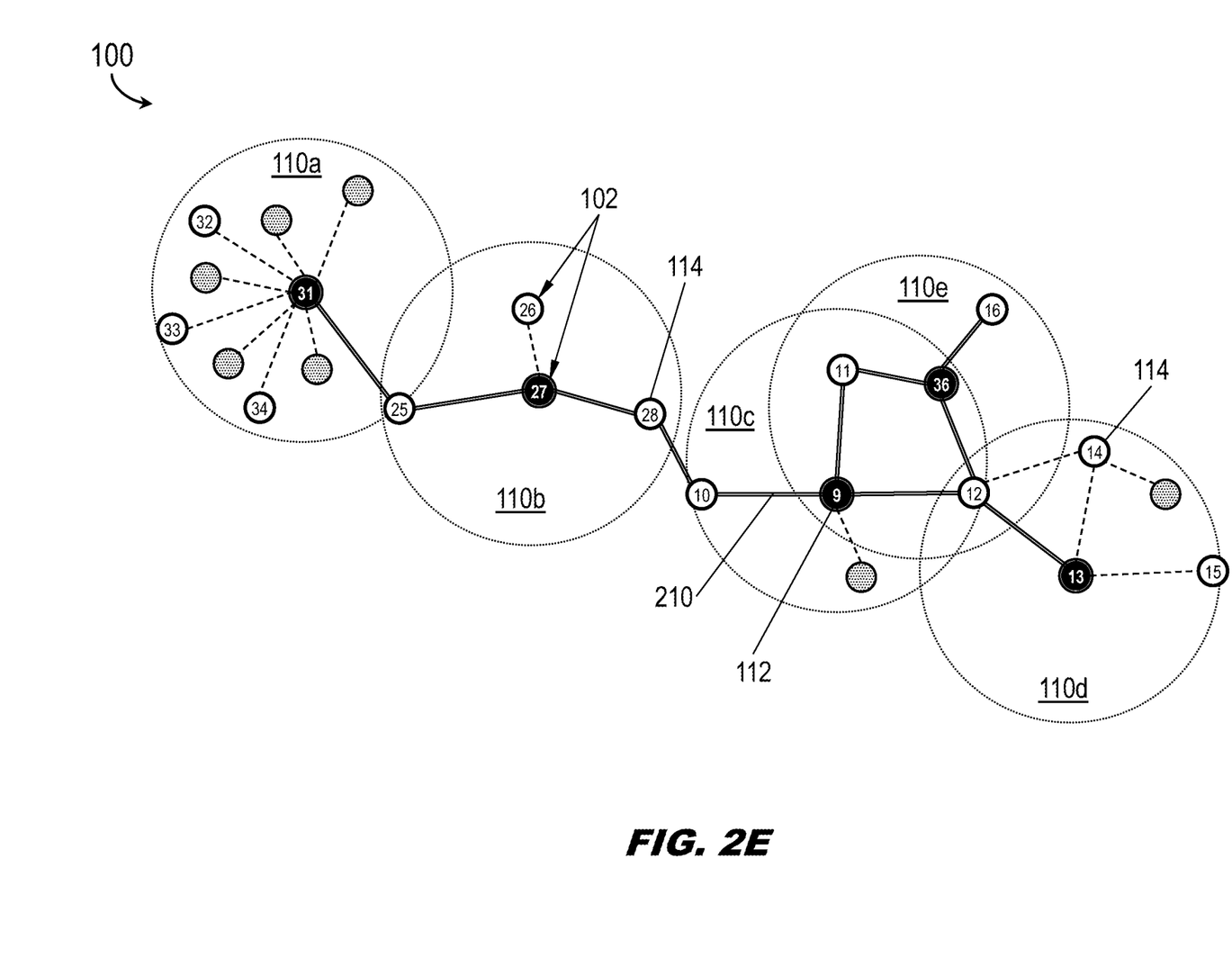
FIG. 2E is a diagrammatic illustration of critical paths of the multi-node communications network of FIG. 1.

In embodiments, referring also to FIGS. 2C through 2E, each communications node 102 of the multi-node communications network 100 may review its inbound partial neighbor lists (206a-d) to determine whether or not the communications node is on a critical path (e.g., whether or not the multi-node communications network may partition without the communications node). For example, the clusterhead node 9 (112) may review the partial neighbor lists 206a-c respectively transmitted by its one-hop neighbors (gateway nodes 10, 11, 12) The partial neighbor list 206a transmitted by the gateway node 10 (114) (and excluding the receiving node, clusterhead node 9, which is common to all partial neighbor lists 206a-c) may include a unique identifier (node 10) and clustering status (GW, gateway) for the transmitting node 10 itself, as well as a unique identifier (28) and clustering status (GW, gateway) for its one-hop neighbor (gateway node 28). Similarly, the partial neighbor list 206b may identify, and indicate the status of, the transmitting node (node 11, GW/gateway) and its other one-hop neighbor (node 36, CH/clusterhead). Finally, the partial neighbor list 206c may identify, and indicate the status of, the transmitting node (node 12, GW/gateway) and also identifies and indicates the status of three critical one-hop neighbors (node 13, CH/clusterhead; node 36, CH/clusterhead; and node 14, GW/gateway).

In embodiments, referring in particular to FIG. 2C, if the partial neighbor lists 206a-c have any common elements, the clusterhead node 9 may merge any such partial neighbor lists. For example, as the partial neighbor lists 206b-c (transmitted by gateway nodes 11 and 12) share a common one-hop neighbor (clusterhead node 36), the clusterhead node 9 may merge the partial neighbor lists into the merged list 208. If, however, there is no existing set of neighboring nodes having common elements, the clusterhead node 9 (112) may instead create a set of neighboring nodes for the clusterhead node 9 (e.g., including its neighboring gateway nodes 10, 11, 12).

In embodiments, if more than one set (e.g., partial neighbor list) remains after any necessary merging, the communications node 102 is on a critical path, e.g., without the communications node the multi-node communications network 100 may be partitioned. For example, as multiple sets (e.g., 206a, 208) remain for the clusterhead node 9, the clusterhead node 9 may conclude that it is on a critical path. (See, e.g., FIG. 2E.)

In embodiments, referring in particular to FIG. 2D, the gateway node 14 (114) may similarly review the partial neighbor lists 206d-c received respectively from its one-hop neighbors, gateway node 12 and clusterhead node 13. For example, the partial neighbor list 206d identifies, and indicates the clustering status of, the transmitting node (12, GW/gateway) and its one-hop neighbors (9, CH/clusterhead; 13, CH/clusterhead). Similarly, the partial neighbor list 206c identifies, and indicates the clustering status of, the transmitting node (13, CH/clusterhead) and its one-hop neighbors (12, GW/gateway; 15, GW/gateway). As shown by FIG. 2D, the partial neighbor lists 206d-e may differ from the partial neighbor lists 206a-c of FIG. 2C in that the partial neighbor lists 206d-e share common elements, particularly gateway node 12 and clusterhead node 13. Accordingly, the gateway node 14 merges the partial neighbor lists 206d-e into a single set 208. Because only the single set 208 remains, the gateway node 14 may conclude that it is not on a critical path.

In embodiments, referring also to FIG. 2E, and as shown by FIGS. 2C and 2D respectively, the clusterhead node 9 (112) is on a critical path 210 while the gateway node 14 (114) is not on a critical path. For example, if the connection between clusterhead node 9 and the neighboring gateway node 10 is severed, the clusters 110a-b may be partitioned from the clusters 110c-e. However, if either connection between the gateway node 14 and respectively the gateway node 12 and the clusterhead node 13 is severed (e.g., if either, but not both, of the nodes 12, 13 is lost), the gateway node 14 will not be partitioned from the multi-node communications network 100 (but will instead remain connected via the remainder of the two nodes 12, 13). Similarly, it can be shown by the above process that the clusterhead node 36 is also on a critical path 210 (e.g., with respect to the gateway node 16). In embodiments, it may be similarly shown that the clusterhead nodes 13, 27 and the gateway nodes 10, 12, 28 are also on a critical path 210, as the loss of any one of these nodes would partition a portion of the multi-node communications network 100.

Figure 2F:
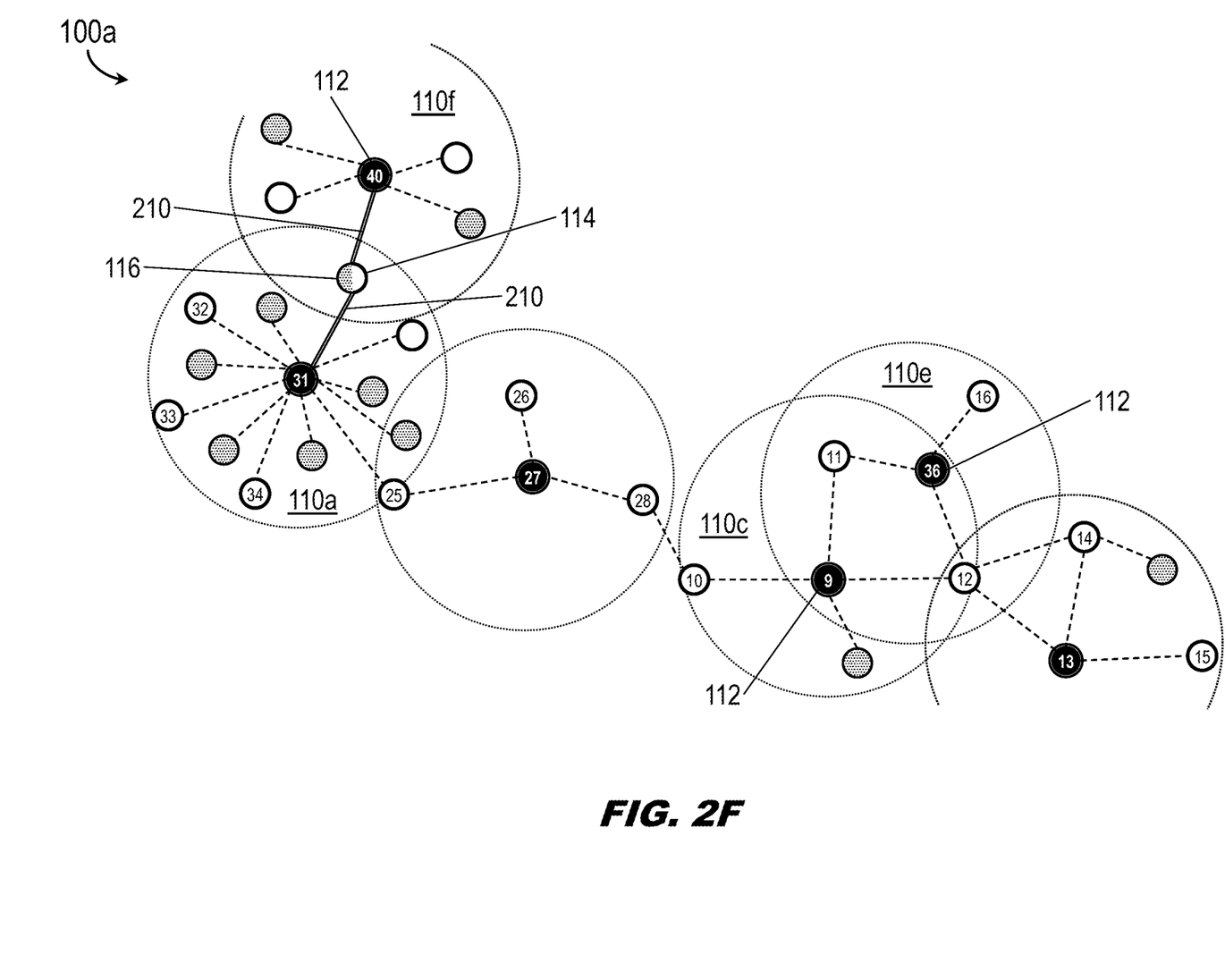
FIG. 2F is a diagrammatic illustration of a promotion/status transition of an ordinary node of the multi-node communications network of FIG. 1.

In some embodiments, referring now to FIG. 2F, the multi-node communications network 100a may be implemented and may function similarly to the multi-node communications network 100 of FIGS. 1 through 2E, except for the addition of cluster 110f and its clusterhead node 40 (112).

In embodiments, ordinary nodes 116 may transmit and receive partial neighbor lists (FIGS. 2A and 2B: 204, 206) and may determine, via the above detection process, that the ordinary node is on a critical path 210. For example, the ordinary node 116 of cluster 110a may establish a link to the clusterhead node 40 (e.g., due to the movement of the clusterhead node 40 and/or its cluster 110f proximate to the cluster 110a and ordinary node 116). In embodiments, the ordinary node 116 may determine via the detection process shown by FIGS. 2A through 2E that the ordinary node is on a critical path 210 connecting the clusters 110a-e to the cluster 110f through the ordinary node. For example, loss of the ordinary node 116 may partition the cluster 110f from the remainder of the multi-node communications network 100a. Accordingly, the ordinary node 116 may immediately transition to gateway node status (114).

The clusterhead nodes 9 and 36 (112) may exist within the same cluster (e.g., overlapping clusters 110c, 110e). In some embodiments, rather than either of the clusterhead nodes 9, 36 immediately resigning, both clusterhead nodes 9, 36 may retain their clusterhead status, e.g., if the clusterhead nodes are on a critical path 210 in accordance with status transition rules of the multi-node communications networks 100, 100a as described in greater detail below.

Figure 3:
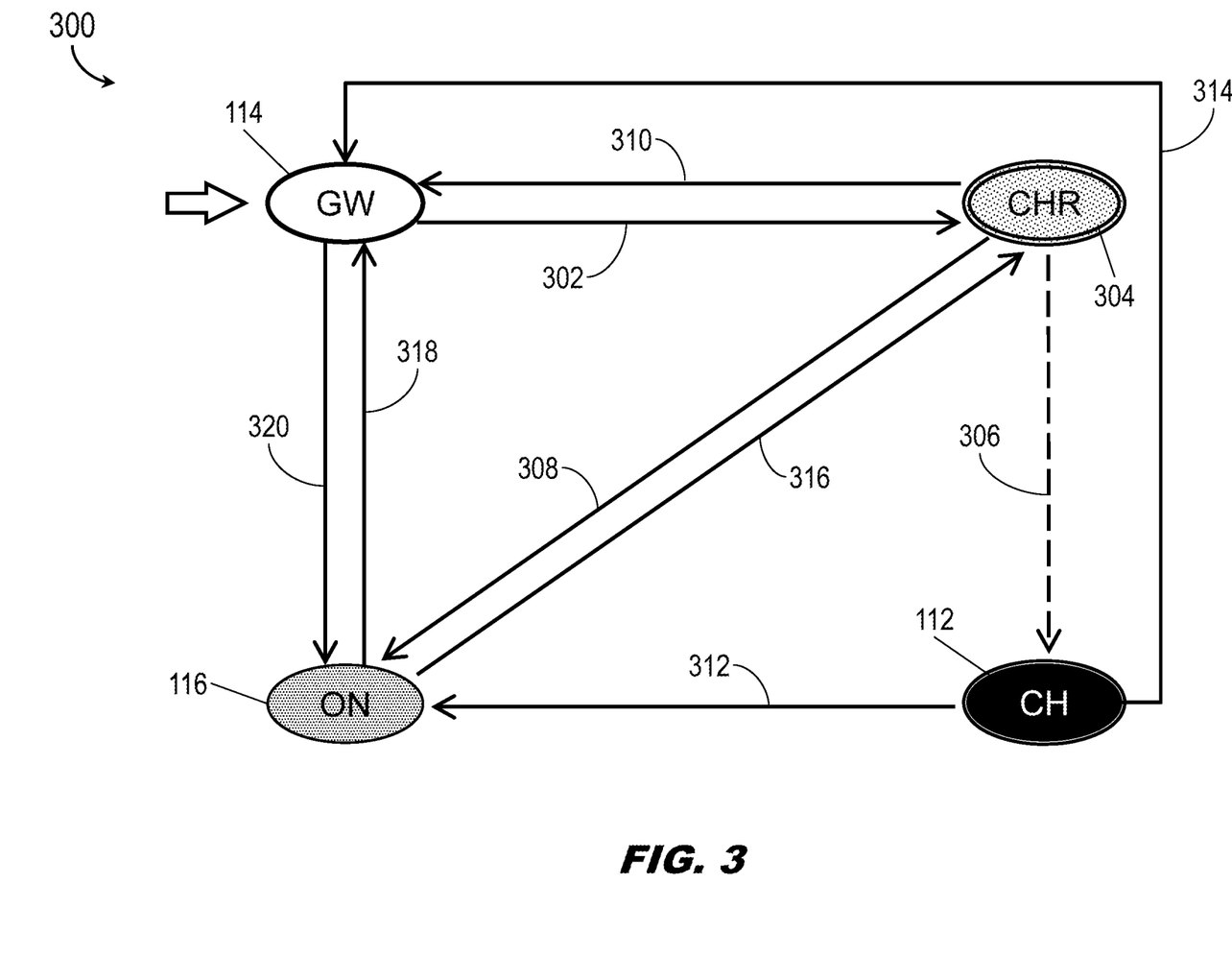
FIG. 3 is a node status transition diagram of the multi-node communications network of FIG. 1.

Referring now to FIG. 3, a status transition diagram 300 of the multi-node communications networks 100, 100a of FIGS. 1 through 2F is shown.

In embodiments, each communications node (102, FIG. 1) of the multi-node communications network 100 may have as its initial clustering status (e.g., prior to beaconing cycles and network configuration) a gateway node (114) status and any relayed partial neighbor lists or other transmissions may identify the node as a gateway node. As new link information is received, e.g., via exchange of partial neighbor lists and critical node detection as shown above, each communications node 102 may update its own local neighbor lists and/or link status information and, based on changes to this information, may transition to a different node status. For example, if according to updated link or local neighbor information there are no clusterhead nodes 112 within the multi-node communications network 100, a gateway node 114 may transition (302) to clusterhead-ready status (304). A clusterhead-ready node 304 may designate itself (306) as a clusterhead node 112 upon successful transmission of, e.g., a partial neighbor list or other applicable data packet. However, a clusterhead-ready node 304 may alternatively transition (308) to ordinary node status (116), e.g., if the clusterhead-ready node receives a data packet from a clusterhead node 112 AND the following relationship applies:

$$GW \geq \alpha^*(CH) + \beta \qquad [1]$$

where GW is the current number of communications nodes throughout the multi-node communications network having a gateway node status (114), CH is the current number of communications nodes throughout the multi-node communications network having a clusterhead node status (112), and α, β are gateway redundancy factors manually or automatically adjustable to control the number and density of gateway nodes (and therefore number of ordinary/noncritical nodes) within the multi-node communications network 100. Although the examples provided herein provide for gateway redundancy factors which are equal (e.g., α=β=1), it is noted herein that the gateway redundancy factors α, β need not be equal. In embodiments, adjusting the gateway redundancy factors α, β may alter the ratio of gateway nodes 114 to ordinary nodes 116, which may affect the density of data transmission throughout the multi-node communications network 100. By adjusting the ratio of gateway nodes 112 to ordinary nodes 116 within the multi-node communications network 100, the network may be tailored according to a number of factors including, but not limited to, importance of data delivery, delay requirements, bandwidth requirements, number of communications nodes 102, density of communications nodes, and the like.

In embodiments, the clusterhead-ready node 304 may transition (310) back to a gateway node 114, e.g., if the clusterhead-ready node is inactive (e.g., for a predetermined time-out period) OR if the clusterhead-ready node receives a data packet from a clusterhead node 112 AND the following relationship applies:

$$GW < \alpha^*(CH) + \beta \qquad [2]$$

In embodiments, a clusterhead node 112 may transition (312) to an ordinary node 116 if the clusterhead node receives a data packet from another clusterhead node AND all of the following apply:

$$GW < \alpha^*(CH) + \beta; \qquad [1]$$

the clusterhead node is NOT on a critical path; AND
every gateway node 114 in the corresponding cluster has more than two clusterhead nodes (e.g., has more than one alternative clusterhead node).

Similarly, the clusterhead node 112 may transition (314) to gateway node status (114) if the clusterhead node receives a data packet from another clusterhead node AND all of the following apply:

$$GW < \alpha*(CH) + \beta; \qquad [2]$$

the clusterhead node is NOT on a critical path; AND
every gateway node 114 in the corresponding cluster has more than two clusterhead nodes (e.g., has more than one alternative clusterhead node).

Referring back to FIG. 2E, it may be observed that the clusterhead nodes 9, 36 (112), while coexisting within the same cluster (e.g., overlapping clusters 110c, 110e) may both retain their clusterhead status due to both clusterhead nodes being on a critical path 210.

In embodiments, an ordinary node 116 may transition (316) to clusterhead-ready status 304 if there are no other clusterhead nodes 112 within the multi-node communications network.

In embodiments, an ordinary node 116 may transition (318) to gateway node status 114 if either of the following applies:
the ordinary node is inactive (e.g., for at least a predetermined time-out period);
the ordinary node is on a critical path; OR $$GW < \alpha*(CH) + \beta. \qquad [2]$$

In embodiments, the gateway node 114 may transition (320) to ordinary node status (116) if relationship [2] applies ($GW \geq \alpha*(CH) + \beta$).

In some embodiments, the multi-node communications network 100 may provide for other node statuses and/or other algorithms or rules regulating transitions between these statuses, e.g., as provided for by EFPC, ZOEF, or any other appropriate efficient flooding and/or passive clustering schemes utilized by the multi-node communications network 100 (for example, as described in greater detail by related U.S. patent application Ser. Nos. 16/369,398 and 16/987,671 incorporated herein by reference in their entirety).

Figure 4A:
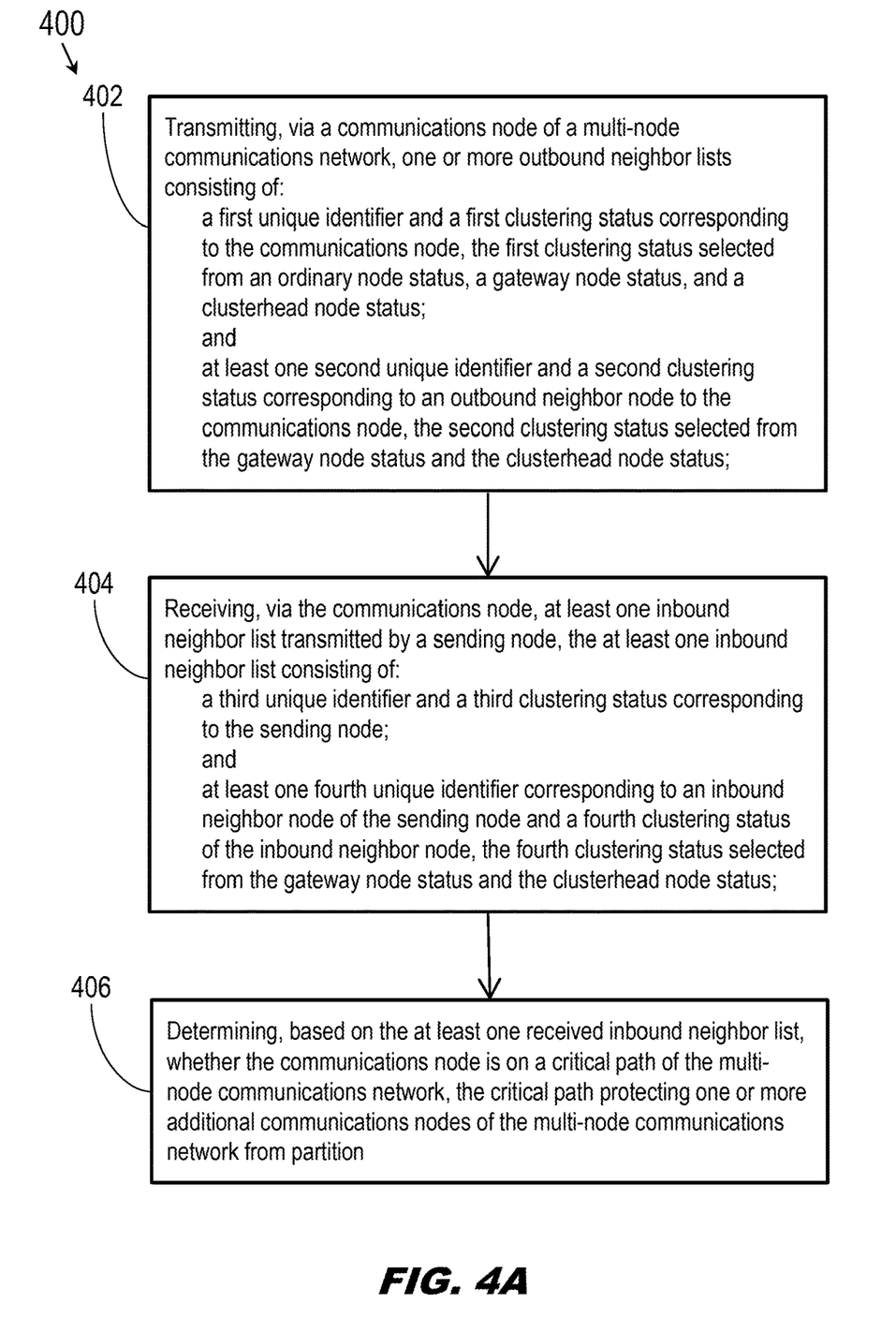
FIGS. 4A through 4D are flow diagrams illustrating a method for beacon-based passive clustering according to example embodiments of this disclosure.

Referring now to FIG. 4A, the method 400 may be implemented by embodiments of the communications node 102 of the multi-node communications network 100 and may include the following steps.

At a step 402, the communications node transmits one or more outbound partial neighbor lists. Each partial neighbor list uniquely identifies the transmitting communications node and indicates its clustering status (e.g., gateway or clusterhead) and likewise provides a unique identifier and clustering status for every one-hop neighbor to the transmitting communications node having either a gateway or a clusterhead node status. In some embodiments, the partial neighbor lists are transmitted via high energy beacon signals. In some embodiments, the partial neighbor lists are transmitted via hello messages.

At a step 404, the communications node receives inbound partial neighbor lists from its one-hop neighbors. Each inbound partial neighbor list uniquely identifies the transmitting neighbor node and its clustering status, and likewise provides a unique identifier and clustering status (clusterhead or gateway) for each one-hop neighbor to the transmitting node having a clusterhead or gateway status.

At a step 406, the communications node determines, based on the received inbound partial neighbor lists, whether or not the communications node is on a critical path (e.g., loss of the node would partition the network into two or more disconnected portions).

Figure 4B:
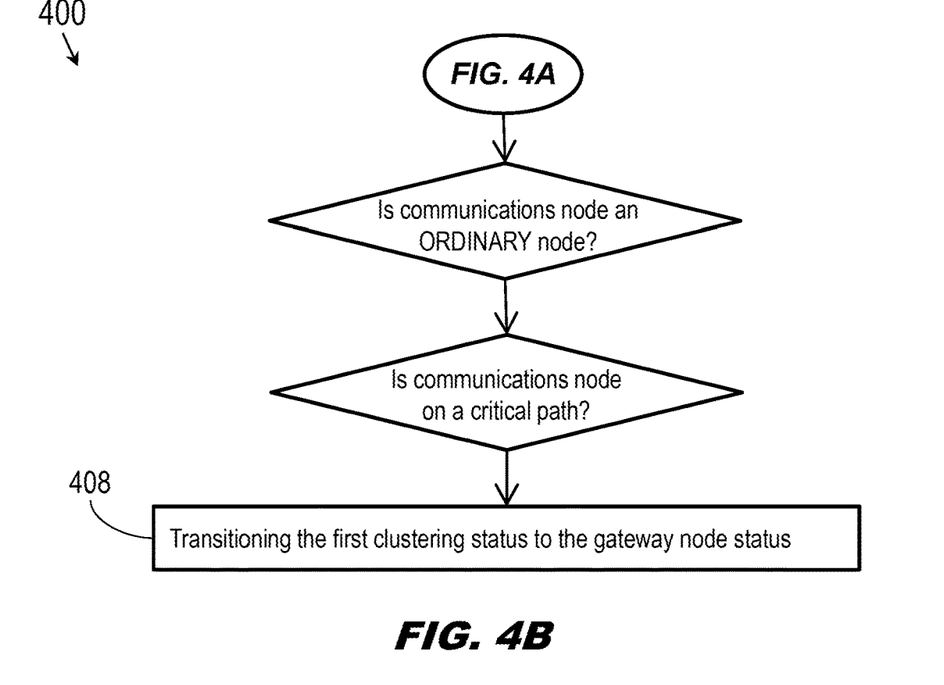

Referring to FIG. 4B, the method 400 may include an additional step 408. At the step 408, if the communications node is an ordinary node, and the communications node is a critical path, the communications node transitions from ordinary node status to gateway node status.

Figure 4C:
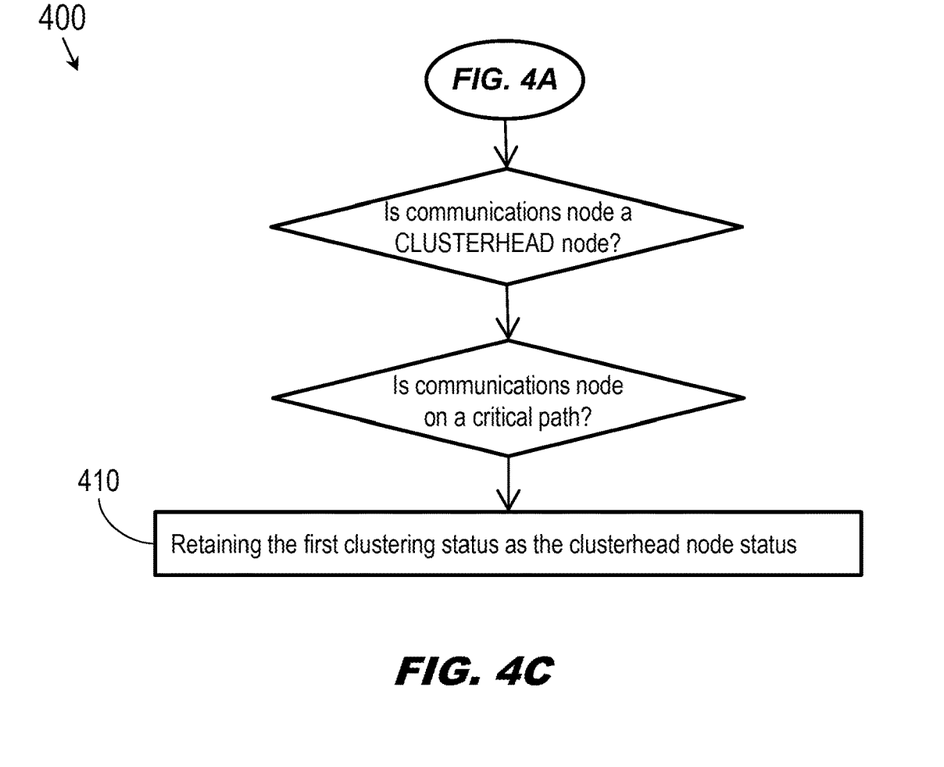

Referring to FIG. 4C, the method 400 may include an additional step 410. At the step 410, if the communications node is a clusterhead node, and the communications node is a critical path, the communications node may retain its clusterhead node status. For example, the clusterhead node may retain its clusterhead node status even if another clusterhead node exists within its cluster or transmission range.

Figure 4D:
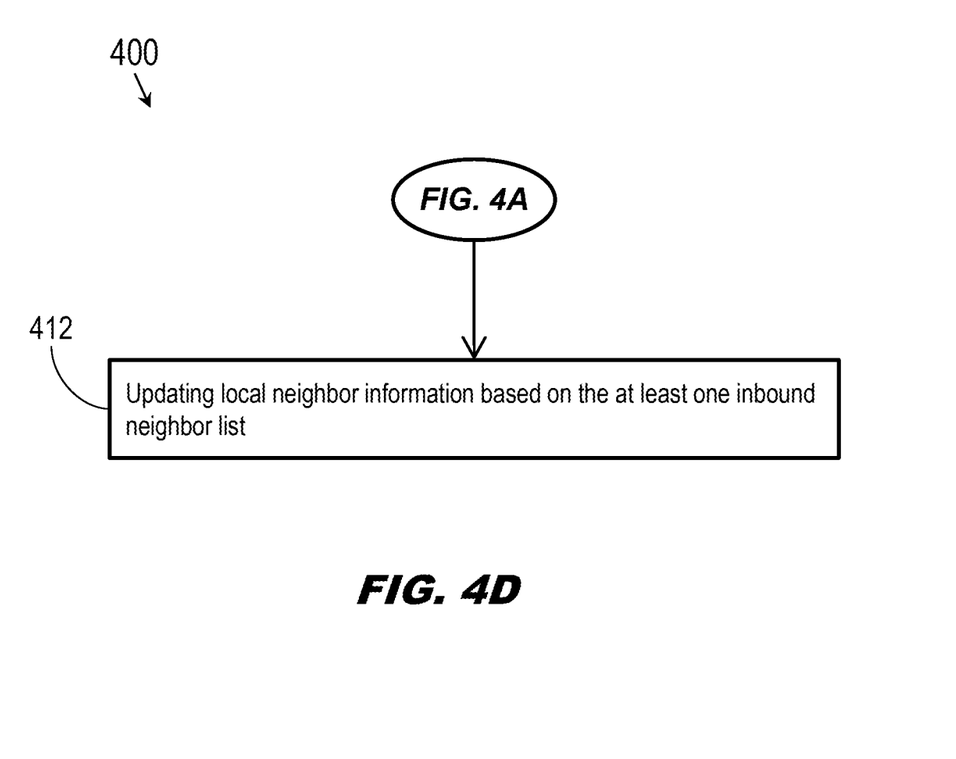

Referring to FIG. 4D the method 400 may include an additional step 412. At the step 412, the communications node updates its local neighbor lists and/or link status information based on the received inbound partial neighbor lists.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A communications node of a multi-node communications network, comprising:
   a communications interface;
   and
   a controller communicatively coupled to the communications interface, the controller configured to:
   1) transmit to one or more one-hop neighbor nodes of the communications node, via the communications interface, at least one outbound neighbor list consisting of:
      a first unique identifier and a first clustering status corresponding to the communications node, the first clustering status selected from an ordinary node status, a gateway node status, and a clusterhead node status;
      and
      at least one second unique identifier and a second clustering status corresponding to an outbound neighbor node to the communications node, the second clustering status selected from the gateway node status and the clusterhead node status;

2) receive from one or more sending nodes at least one inbound neighbor list consisting of:
a third unique identifier and a third clustering status corresponding to the sending node;
and
at least one fourth unique identifier and a fourth clustering status corresponding to an inbound neighbor node of the sending node, the fourth clustering status selected from the gateway node status and the clusterhead node status;
and
determine, based on the at least one inbound neighbor list, whether the communications node is on a critical path of the multi-node communications network, the critical path protecting one or more additional communications nodes of the multi-node communications network from partition.

2. The communications node of claim 1, wherein the controller is configured to transmit the at least one outbound neighbor list via a hello message.

3. The communications node of claim 1, wherein the controller is configured to transmit the at least one outbound neighbor list via a beacon signal.

4. The communications node of claim 1, wherein:
the first clustering status is the ordinary node status;
the communications node is on the critical path; and
the communications node is configured to transition the first clustering status to the gateway node status.

5. The communications node of claim 1, wherein:
the first clustering status is the clusterhead node status;
the communications node is on the critical path; and
the communications node is configured to retain the clusterhead node status.

6. The communications node of claim 5, wherein:
the communications node is associated with a cluster of one or more additional communications nodes;
and
the one or more additional communications nodes include at least one additional communications node also having the clusterhead node status.

7. The communications node of claim 1, wherein the controller is configured to update its local neighbor information based on the at least one inbound neighbor list.

8. A method for beacon-based passive clustering in a mobile ad hoc network (MANET), the method comprising:
transmitting, via a communications node of a multi-node communications network, one or more outbound neighbor lists consisting of:
a first unique identifier and a first clustering status corresponding to the communications node, the first clustering status selected from an ordinary node status, a gateway node status, and a clusterhead node status;
and
at least one second unique identifier and a second clustering status corresponding to an outbound neighbor node to the communications node, the second clustering status selected from the gateway node status and the clusterhead node status;
receiving, via the communications node, at least one inbound neighbor list transmitted by a sending node, the at least one inbound neighbor list consisting of:
a third unique identifier and a third clustering status corresponding to the sending node;
and
at least one fourth unique identifier corresponding to an inbound neighbor node of the sending node and a fourth clustering status of the inbound neighbor node, the fourth clustering status selected from the gateway node status and the clusterhead node status;
and
determining, based on the at least one received inbound neighbor list, whether the communications node is on a critical path of the multi-node communications network, the critical path protecting one or more additional communications nodes of the multi-node communications network from partition.

9. The method of claim 8, wherein transmitting, via a communications node of a multi-node communications network, one or more outbound neighbor lists includes:
transmitting the one or more outbound neighbor lists via one or more hello messages.

10. The method of claim 8, wherein transmitting, via a communications node of a multi-node communications network, one or more outbound neighbor lists includes:
transmitting the one or more outbound neighbor lists via one or more beacon signals.

11. The method of claim 8, wherein the first clustering status is the ordinary node status and the communications node is on a critical path, further comprising:
transitioning the first clustering status to the gateway node status.

12. The method of claim 8, wherein the first clustering status is the clusterhead node status and the communications node is on a critical path, further comprising:
retaining the first clustering status as the clusterhead node status.

13. The method of claim 12, wherein the communications node is associated with a cluster of one or more additional communications nodes, the cluster including at least one additional communications node also having the clusterhead node status.

14. The method of claim 8, further comprising:
updating local neighbor information based on the at least one inbound neighbor list.

* * * * *